(12) United States Patent
Danker et al.

(10) Patent No.: US 8,132,118 B2
(45) Date of Patent: Mar. 6, 2012

(54) INTELLIGENT DEFAULT SELECTION IN AN ON-SCREEN KEYBOARD

(75) Inventors: Daniel Danker, Sunnyvale, CA (US); Steven Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/537,976

(22) Filed: Oct. 2, 2006

(65) Prior Publication Data

US 2007/0038951 A1 Feb. 15, 2007

Related U.S. Application Data

(62) Division of application No. 10/458,083, filed on Jun. 10, 2003, now Pat. No. 7,130,846.

(51) Int. Cl.
*G06F 3/048* (2006.01)

(52) U.S. Cl. ........ 715/780; 715/711; 715/773; 715/812; 715/816; 715/822; 707/759; 707/765; 707/766; 707/767; 725/37; 725/39; 725/53

(58) Field of Classification Search .................. 715/711, 715/773, 812, 816, 822, 780; 707/759, 765, 707/766, 767; 725/37, 39, 53
See application file for complete search history.

(56) References Cited

U.S. PATENT DOCUMENTS

| | | | |
|---|---|---|---|
| 4,862,390 A | | 8/1989 | Weiner |
| 5,629,733 A | * | 5/1997 | Youman et al. .................. 725/53 |
| 5,724,457 A | * | 3/1998 | Fukushima .................. 382/311 |
| 5,734,749 A | * | 3/1998 | Yamada et al. ................ 382/187 |
| 5,748,512 A | * | 5/1998 | Vargas .......................... 708/142 |
| 5,799,299 A | | 8/1998 | Fujiwara |
| 5,999,950 A | | 12/1999 | Krueger et al. |
| 6,008,799 A | * | 12/1999 | Van Kleeck .................. 345/173 |
| 6,216,264 B1 | * | 4/2001 | Maze et al. ..................... 725/53 |
| 6,359,572 B1 | * | 3/2002 | Vale ................................ 341/23 |
| 6,564,213 B1 | * | 5/2003 | Ortega et al. ..................... 707/5 |
| 6,573,844 B1 | * | 6/2003 | Venolia et al. .................. 341/22 |
| 6,608,639 B2 | * | 8/2003 | McGovern .................... 715/780 |

(Continued)

FOREIGN PATENT DOCUMENTS

EP 1246430 A2 10/2002

(Continued)

OTHER PUBLICATIONS

PCT International Search Report and Written Opinion for Application PCT/US2006/033463 mailed on Sep. 12, 2006, pp. 1-10.

(Continued)

*Primary Examiner* — Tadeese Hailu
*Assistant Examiner* — Patrick Riegler
(74) *Attorney, Agent, or Firm* — Lee & Hayes, PLLC (57) ABSTRACT

Systems and methods are described for intelligent default selection of characters to be entered via an on-screen keyboard. Based on one to several criteria, a character most likely to be selected for entry via the on-screen keyboard during a search request is determined and a selector is positioned at that particular character. If that character is indeed the character the user wishes to enter, the user does not have to execute any navigation steps to enter the character, but can—with a single actuation—enter that character. In many instances, the user will only have to enter the selection without first having to navigate to the selection. As a result, the number of times buttons need to be actuated by the user to enter a character string can be significantly reduced.

20 Claims, 6 Drawing Sheets

U.S. PATENT DOCUMENTS

| | | | |
|---|---|---|---|
| 6,646,572 B1 * | 11/2003 | Brand | 341/22 |
| 6,654,733 B1 * | 11/2003 | Goodman et al. | 706/52 |
| 6,661,482 B2 | 12/2003 | Hara | |
| 6,734,881 B1 * | 5/2004 | Will | 715/811 |
| 6,801,190 B1 * | 10/2004 | Robinson et al. | 345/173 |
| 6,801,659 B1 | 10/2004 | O'Dell | |
| 6,810,272 B2 * | 10/2004 | Kraft et al. | 455/566 |
| 7,098,896 B2 * | 8/2006 | Kushler et al. | 345/168 |
| 7,130,846 B2 | 10/2006 | Danker et al. | |
| 7,152,213 B2 * | 12/2006 | Pu et al. | 715/812 |
| 7,213,256 B1 | 5/2007 | Kikinis | |
| 7,218,249 B2 * | 5/2007 | Chadha | 341/23 |
| 7,228,556 B2 * | 6/2007 | Beach et al. | 725/53 |
| 7,240,293 B2 * | 7/2007 | Lungwitz et al. | 715/780 |
| 7,318,019 B1 * | 1/2008 | Baker et al. | 704/1 |
| 7,533,352 B2 * | 5/2009 | Chew et al. | 715/781 |
| 7,539,472 B2 * | 5/2009 | Sloo | 455/151.1 |
| 2001/0009009 A1 * | 7/2001 | Iizuka | 707/539 |
| 2001/0044837 A1 | 11/2001 | Talib et al. | |
| 2002/0016804 A1 | 2/2002 | Wasilewski | |
| 2003/0005445 A1 * | 1/2003 | Schein et al. | 725/51 |
| 2003/0014753 A1 | 1/2003 | Beach et al. | |
| 2003/0066085 A1 | 4/2003 | Boyer et al. | 725/104 |
| 2004/0021691 A1 * | 2/2004 | Dostie et al. | 345/773 |
| 2004/0080487 A1 * | 4/2004 | Griffin et al. | 345/156 |
| 2004/0153963 A1 * | 8/2004 | Simpson et al. | 715/500.1 |
| 2004/0153975 A1 * | 8/2004 | Williams et al. | 715/531 |
| 2005/0240964 A1 | 10/2005 | Barrett | |
| 2006/0167859 A1 | 7/2006 | Verbeck Sibley et al. | |
| 2007/0050337 A1 | 3/2007 | Venkataraman et al. | |
| 2007/0061321 A1 | 3/2007 | Venkataraman et al. | |
| 2007/0061754 A1 | 3/2007 | Ardhanari et al. | |

FOREIGN PATENT DOCUMENTS

| | | |
|---|---|---|
| JP | 5314182 A | 11/1993 |
| JP | 625934 | 4/1994 |
| JP | 6203012 A | 7/1994 |
| JP | 9269949 A | 10/1997 |
| JP | 2002244791 A | 8/2002 |
| JP | 2002252813 A | 9/2002 |
| WO | WO9414284 | 6/1994 |
| WO | WO2005064587 A2 | 7/2005 |

OTHER PUBLICATIONS

OA dated Oct. 23, 2009 for JP Patent Application No. 2008-531248, 9 Pages.

Koizumi, "The Definitive Version of the Latest Freeware & Shareware Information! Download ASCII," Internet ASCII, vol. 4, No. 3, p. 189, ASCII, Japan, Mar. 1, 1999.

Notice of Rejection for Japanese Patent Application No. 2004-173092 mailed Apr. 6, 2010.

Translated Japanese Notice of Rejection mailed Aug. 26, 2011 for Japanese Patent Application No. 2011-055641, a counterpart foreign application of US Patent No. 7,130,846, 3 pages.

The Mexican Office Action mailed Jun. 16, 2011 for Mexican Patent Application No. MX/a/2008/003325, a counterpart foreign application of US Patent No. 7,539,472, 9 pgs.

Chinese Office Action mailed Nov. 30, 2011 for Chinese Patent Application No. 200680033358.8, a counterpart foreign application of US patent No. 7,539,472, 6 pages.

* cited by examiner

Fig. 6

INTELLIGENT DEFAULT SELECTION IN AN ON-SCREEN KEYBOARD

RELATED APPLICATIONS

This application is a divisional of and claims priority to U.S. patent application Ser. No. 10/458,083 entitled "Intelligent Default Selection in an On-Screen Keyboard" filed Jun. 10, 2003 to Danker et al., the disclosure of which is incorporated by reference herein

TECHNICAL FIELD

The systems and methods described herein relate to on-screen, or "soft" keyboards. More particularly, the described systems and methods relate to intelligent default selection during data entry using an on-screen keyboard or any other method with limited data entry capabilities.

BACKGROUND

There are several applications in which a user may be required to enter data by way of an on-screen keyboard, or "soft" keyboard. Typically, an on-screen keyboard is a user interface that displays the most commonly used keys of a standard keyboard. Data is entered by navigating a selector (e.g., a cursor or highlight) to select a key and activating a button to enter a character associated with the selected key. Some character entry user interfaces may display only a single alphanumeric character from a list that may be scrolled to change characters for selection. The list is scrolled to select the desired character and the selected character can be entered by actuation of a button.

But navigating the on-screen keyboard can be a slow and burdensome process because when a character key is selected, the position of the selector is simply placed at the beginning of a list of characters or it remains at the location of the most-recently selected character. When multiple characters are sequentially selected (a character string) to search for a particular item containing the character string, no anticipation of a subsequent character that may be selected is computed, so the user is usually required to execute several navigation actuations to select each character.

SUMMARY

The systems and methods described herein provide for intelligent default selection of characters to be entered via an on-screen keyboard, especially in relation to a search through a known set of possible results, such as a database. Based on one to several criteria, a character most likely to be selected via the on-screen keyboard during a search request is determined and a selector is positioned at that particular character. If that character is indeed the character the user wishes to select, the user does not have to execute any navigation steps to enter the character, but can—with a single actuation—enter that character.

The selection (the character on which the selector is positioned) changes based on the set of results that the keyboard is enabling the user to navigate. When a character is selected, the known set of results is narrowed to only those results that contain the previously selected characters in the order in which they were selected. A character in a position subsequent to the position of the character most recently entered is analyzed in each possible result. The character that appears most often in that position among the possible selections is made the default selection for the subsequent character. In many instances, the user will only have to enter the selection without first having to navigate to the selection. As a result, this technique significantly reduces the number of times buttons need to be actuated by the user to enter a character string.

BRIEF DESCRIPTION OF THE DRAWINGS

The same numbers are used throughout the drawings to reference like features and components.

DETAILED DESCRIPTION

Systems and methods for intelligent default selection in an on-screen keyboard are described below. To first describe an operating environment on which the described techniques may be implemented, an exemplary broadcast system architecture and an exemplary client device in a television-based system are initially described with reference to FIG. 1 and FIG. 2, respectively.

Exemplary Broadcast System

Figure 1:
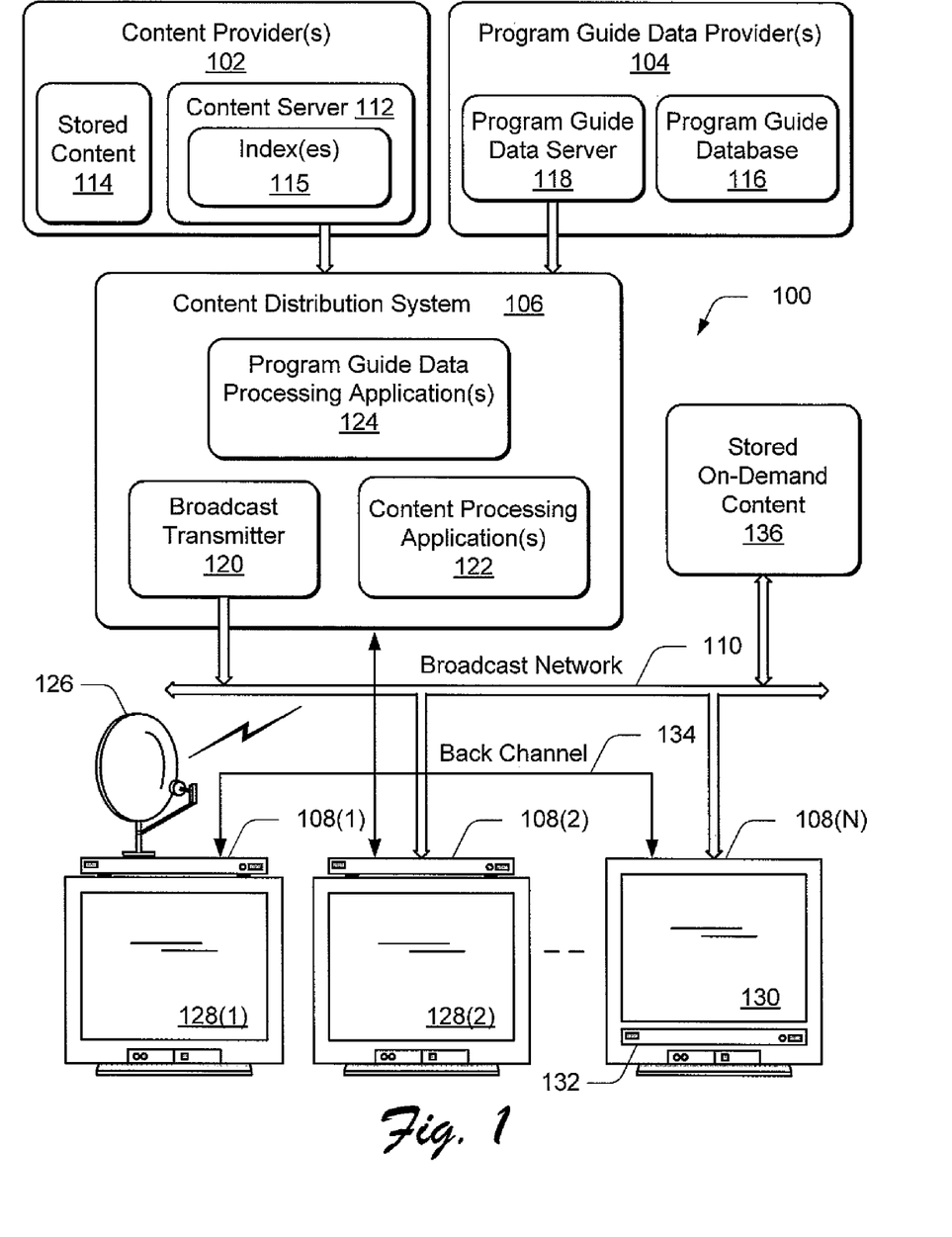
FIG. 1 illustrates an exemplary system architecture in which the described systems and methods can be implemented.

FIG. 1 illustrates an exemplary system 100 in which an intelligent default selection in an on-screen keyboard can be implemented. System 100 facilitates distribution of content and program guide data to multiple viewers. The system 100 includes one or more content providers 102, one or more program guide data providers 104, a content distribution system 106, and multiple client devices 108(1), 108(2) . . . 108(N) coupled to the content distribution system 106 via a broadcast network 110.

A content provider 102 can be implemented as a satellite operator, a network television operator, a cable operator, and the like. A content provider 102 includes a content server 112 to control distribution of stored content 114, such as movies, television programs, commercials, music, and similar audio, video, and/or image content from content provider 102 to the content distribution system 106. The stored content 114 may also include content available for purchase, such as pay-per-view and/or video-on-demand content. Additionally, content server 112 controls distribution of live content (e.g., content that was not previously stored, such as live feeds) and/or content stored at other locations to the content distribution system 106. The content server 112 may also include one or more indices 115 associated with the stored content 114 or other content available through the content server 112 so that the indices 115 may be used to search for particular content items. The content distribution system 106 is representative of a headend service and/or program data center that provides content and program guide data to multiple subscribers (e.g., client devices 108).

A program guide data provider 104 includes a program guide database 116 and a program guide data server 118. The program guide database 116 stores program guide data that is used to generate an electronic or interactive program guide (or "program guide"). Program guide data can include a program title, program broadcast day(s) to identify which days of the week the program will be broadcast, program start times(s) to identify a time that the program will be broadcast on the particular day or days of the week, and a program category.

A program guide data provider 104 transmits program guide data to the program guide data server 118, which processes the program guide data prior to distribution to generate a published version of the program guide data which can contain programming information for all broadcast channels and on-demand content listings for one or more days.

Content distribution system 106 includes a broadcast transmitter 120, one or more content processing applications 122, and one or more program guide data processing applications 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless transmission media using any broadcast format or broadcast protocol. Additionally, broadcast network 110 can be any type of network, using any type of network topology and any network communication protocol, and can be represented or otherwise implemented as a combination of two or more networks.

A content processing application 122 processes the content received from a content provider 102 prior to transmitting the content across broadcast network 110. Similarly, a program guide data processing application 124 processes the program guide data received from a program guide data provider 104 prior to transmitting the program guide data across broadcast network 110. A particular content processing application 122 may encode, or otherwise process, the received content into a format that is understood by the multiple client devices 108 which are coupled to broadcast network 110. Although FIG. 1 shows a single content provider 102, a single program guide data provider 104, and a single content distribution system 106, exemplary system 100 can include any number of content providers and/or program guide data providers coupled to any number of content distribution systems.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data, video data, and image data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box 132. In this example, the various components and functionality of the set-top box are integrated into the television rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented using a protocol such as an Internet protocol (IP), UDP protocol, etc. The back channel 134 may also be implemented with various types of delivery mechanisms, such as an RF back channel (i.e., cable), a modem, or the like. The back channel 134 provides an alternate communication link between each of the client devices 108 and the content distribution system 106. In some instances, the back channel 134 may also provide communication between the client devices 108. However, in a typical implementation, one client device 108 must usually communicate with another client device through a headend service.

The exemplary system 100 also includes stored on-demand content 136, such as Video-On-Demand (VOD) and/or Pay-Per-View (PPV) movie content. The stored on-demand content 136 can be viewed with a television 128 via a client device 108 through an onscreen movie guide, for example, and a viewer can enter instructions to stream a particular movie, or other stored content, to a corresponding client device 108.

Exemplary Client Device in a Television-based System

Figure 2:
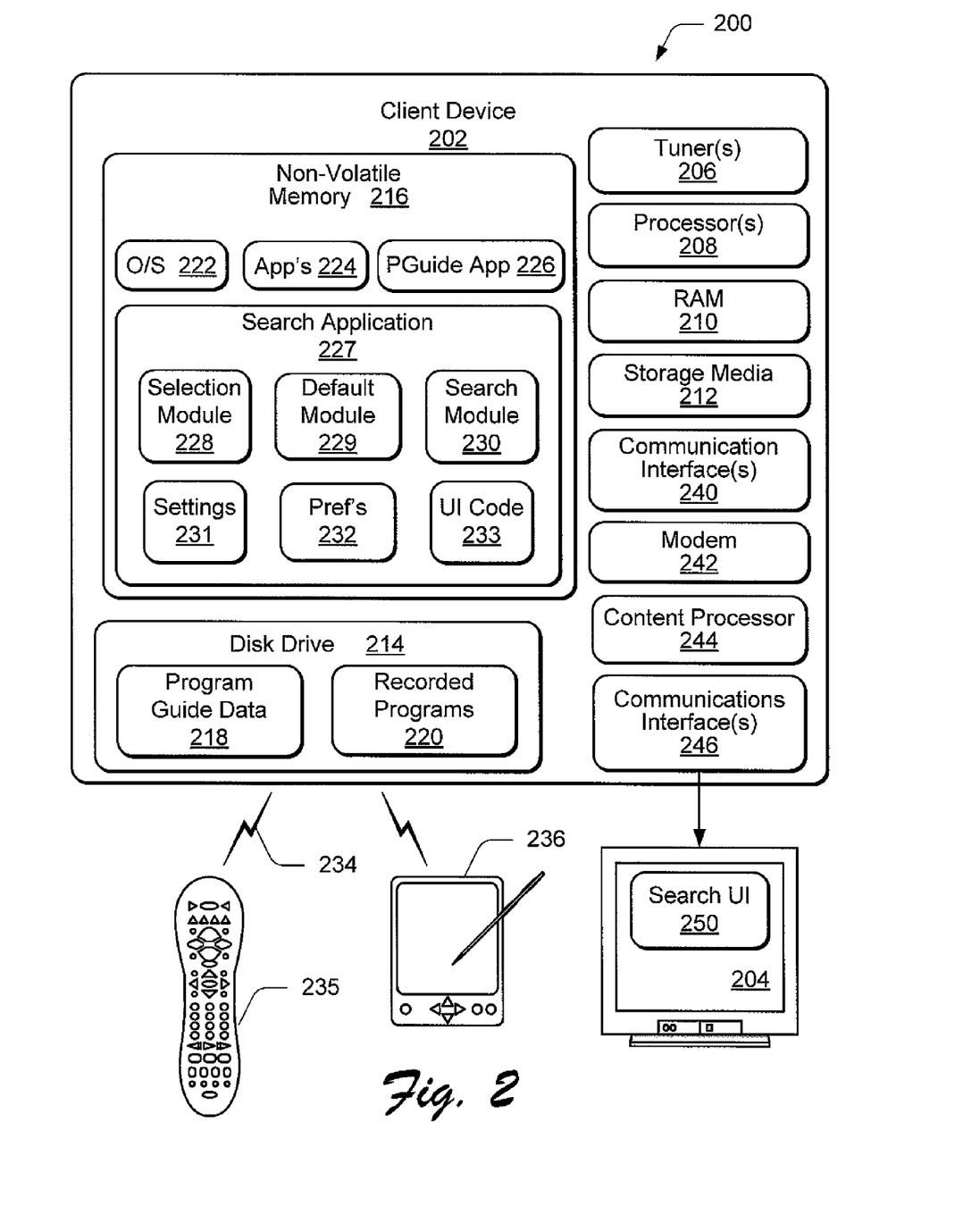
FIG. 2 illustrates a television-based system that includes an exemplary client device on which the described systems and methods can be implemented.

FIG. 2 illustrates a television-based system 200 that includes an exemplary client device 202 that includes components to implement the systems and methods described herein. System 200 also includes a display device 204 to display content received by the client device 202. The client device 202 can be implemented as a set-top box, a satellite receiver, a TV recorder with a hard disk, a digital video recorder (DVR) and playback system, a personal video recorder (PVR) and playback system, a game console, an information appliance, and as any number of similar embodiments.

Client device 202 includes one or more tuners 206 which are representative of one or more in-band tuners that tune to various frequencies or channels to receive television signals, as well as an out-of-band tuner that tunes to the broadcast channel over which program data is broadcast to client device 202. Client device 202 also includes one or more processors 208 (e.g., any of microprocessors, controllers, and the like), which process various instructions to control the operation of client device 202 and to communicate with other electronic and computing devices.

Client device 202 can be implemented with one or more memory components, examples of which include a random access memory (RAM) 210, mass storage media 212, a disk drive 214, and a non-volatile memory 216 (e.g., ROM, Flash, EPROM, EEPROM, etc.). It is noted that any further reference made to storing one or more elements in the non-volatile memory 216 encompasses an included reference to one or more other types of memory, including the RAM 210, the mass storage media 212 and/or the disk drive 214. Disk drive 214 can include any type of magnetic or optical storage device, such as a hard disk drive, a magnetic tape, a rewriteable compact disc, a DVD, and the like. The one or more memory components store various information and/or data such as received content, program guide data 218, recorded programs 220, configuration information for client device 202, and/or graphical user interface information. Alternative implementations of client device 202 can include a range of processing and memory capabilities, and may include any number of differing memory components than those illustrated in FIG. 2. For example, full-resource clients can be implemented with substantial memory and processing resources, whereas low-resource clients may have limited processing and memory capabilities.

An operating system 222 and one or more application programs 224 can be stored in non-volatile memory 216 and executed on processor(s) 208 to provide a runtime environment. A runtime environment facilitates extensibility of client device 202 by allowing various interfaces to be defined that, in turn, allow application programs 224 to interact with client device 202. The application programs 224 can include a browser to browse the Web (e.g., "World Wide Web"), an email program to facilitate electronic mail, and/or any number of other application programs.

A program guide application 226 that executes on processor(s) 208 is also stored in non-volatile memory 216 and is implemented to process the program guide data 218 for display. Program guide application 226 generates the program guides that enable a viewer to navigate through an onscreen display and locate broadcast programs, recorded programs, video-on-demand movies, interactive game selections, and other media access information or content of interest to the viewer. With program guide application 226, the television viewer can look at schedules of current and future programming, set reminders for upcoming programs, and/or enter instructions to record one or more programs.

The non-volatile memory 216 is shown having several modules—discussed below—that may be used in one or more particular implementations. However, it is noted that none or some of the modules may be utilized in other implementations. Moreover, tasks ascribed to a particular module below may—in some implementations—be performed by another module. The delegation of tasks between to particular modules is merely exemplary and is shown for the purpose of enablement. Implementation of the described techniques may be accomplished with other groupings of modules.

The non-volatile memory 216 includes a search application 227 that generally provides intelligent default selection of characters in an on-screen keyboard. The search application 227 includes a selection module 228 that is configured to position a selector, such as a highlight or a cursor, with a displayed character of an on-screen keyboard. A default module 229 determines a default selection for a next character to be entered via an on-screen keyboard, and provides a default character to the selection module 228 for selection. A search module 230 searches a set of possible results for results matching characters selected on an on-screen keyboard.

The non-volatile memory 216 also includes a settings module 231 that stores one or more search criteria, such as whether the search is performed on content titles, actors appearing in video content items, directors of video content items, authors of audio/visual content items, etc. A preferences module 232 tracks user preferences, such as favorite (i.e., most accessed) channels, favorite actors, favorite authors, favorite musicians, favorite directors, favorite content titles, etc. The preferences stored in the preferences module 232 may either be entered by a user or derived from monitoring a user's behavior, or both. User interface (UI) code 233 is also stored in the non-volatile memory 232 and is executable on the processor 208. The UI code 233 is configured to provide a search user interface 250 on the display device 204 (or the handheld input device 236, etc.) and to receive user input via the search user interface 250.

The functions performed by the search application 227 and the modules contained therein will be described below, with respect to FIGS. 3a, 3b and 4.

Client device 202 further includes one or more communication interfaces 246 and a PSTN, DSL, cable, or other type of modem 242. A communication interface 246 can be implemented as a serial and/or parallel interface, as a wireless interface, and/or as any other type of network interface. A wireless interface enables client device 202 to receive control input commands 232 and other information from a user-operated input device, such as from a remote control device 234 or from another infrared (IR), 802.11, Bluetooth, or similar RF input device. Input devices can include a wireless keyboard or another handheld input device 236 such as a personal digital assistant (PDA), handheld computer, wireless phone, or the like. A network interface and a serial and/or parallel interface enables client device 202 to interact and communicate with other electronic and computing devices via various communication links. Modem 242 facilitates client device 202 communication with other electronic and computing devices via a conventional telephone line, a DSL connection, cable, and/or other type of connection.

Client device 202 also includes a content processor 244 which can include a video decoder and/or additional processors to receive, process, and decode broadcast video signals and program data, such as NTSC, PAL, SECAM, or other television system analog video signals, as well as DVB, ATSC, or other television system digital video signals. For example, content processor 244 can include an MPEG-2 or MPEG-4 (Moving Pictures Experts Group) decoder that decodes MPEG-encoded video content and/or image data. The systems described herein can be implemented for any type of video encoding format as well as for data and/or content streams that are not encoded.

Typically, video content and program data includes video data and corresponding audio data. Content processor 244 generates video and/or display content that is formatted for display on display device 204, and generates decoded audio data that is formatted for presentation by a presentation device, such as one or more speakers (not shown) in display device 204. Content processor 244 can include a display controller (not shown) that processes the video and/or display content to display corresponding images on display device 204. A display controller can include a graphics processor, microcontroller, integrated circuit, and/or similar video-processing component to process the images.

Client device 202 also includes an audio and/or video output 246 that provides the audio, video, and/or display signals to television 204 or to other devices that process and/or display, or otherwise render, the audio and video data. Video signals and audio signals can be communicated from client device 202 to television 204 via an RF (radio frequency) link, S-video link, composite video link, component video link, or other similar communication link.

Although shown separately, some of the components of client device 202 may be implemented in an application specific integrated circuit (ASIC). Additionally, a system bus (not shown) typically connects the various components within client device 202. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Exemplary User Interface With On-Screen Keyboard

Figure 3A:
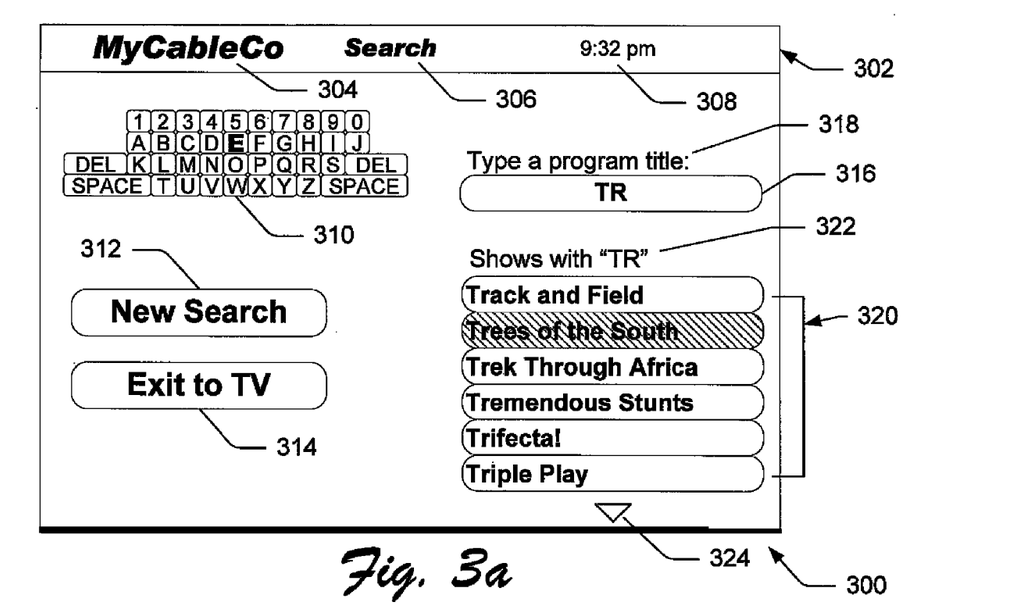
FIG. 3a illustrates an exemplary search user interface.

FIG. 3a is an illustration of a user interface display 300 that may be utilized with the techniques described herein. The user interface (UI) display 300 includes a title bar 302 that is used to display captions and information to a user. In the example shown, the title bar 302 displays a broadcast network name 304 ("MyCableCo"), a page title 306 ("Search") and a current time 308 ("9:32 pm"). The UI display 300 shown here is a search page, but other types of data entry pages may also be used within the scope of the present description.

The UI display 300 also includes an on-screen keyboard 310 that is used to enter characters through the UI display 300.

This particular on-screen keyboard 310 is a representation of a keyboard having several keys that each represent a letter or action. However, other types of on-screen keyboards may also be used, as will be shown below with respect to FIG. 3b. Characters are entered via the on-screen keyboard 310 by selecting a character (such as the "E" character shown here) and entering the character with a button actuation or some other action.

The UI display 300 also includes a "new search" button 312 which can be actuated to begin a new search process, and an "exit to TV" button 314 which, when actuated, returns focus to a television display. The UI display 300 may include these, additional, and/or other such buttons, as the buttons 312, 314 shown are exemplary only.

The UI display 300 displays a character entry field 316, which displays one or more characters after a user has entered the character(s). A character entry field description 318 is shown adjacent to the character entry field 316 and describes the entry contained in the character entry field 316. In the present example, the character entry field 316 is used to enter a title of a content item being searched for. However, other content items—such as actor names, director names, author names, program genres, musician names, etc.—may be used to key a search.

One or more content item description fields 320 are shown by the UI display 300. The content item description fields 320 display particular content items of a kind described in the character entry field description 318. In the present example, there are multiple content item description fields 320 that each displays a character string associated with a content item of the type specified in the character entry field description 318. Since the character entry field description 318 specifies a "program title," the content item description fields 320 each display a title of a content item (program). The order in which the titles are displayed will be discussed in detail, below. The content item description fields 320 are highlightable and selectable and, when highlighted and selected, navigate the user to the selected content program.

Furthermore, manipulation of the content item description fields as discussed below may be implemented in various ways with the default character selection process and should not be limited to any particular implementation, described or not.

A content item description 322 is displayed adjacent to the content item description fields 320 and is used to describe the contents of the content item description fields 320. A scroll actuator 322 is positioned below the content item description fields 320 and is used to scroll through more content item descriptions that are not presently displayed on the UI display 300. It is noted that while only one scroll actuator 322 is shown in the UI display 300, one or more other scroll actuators may also be included to scroll up, left and/or right.

Figure 3B:
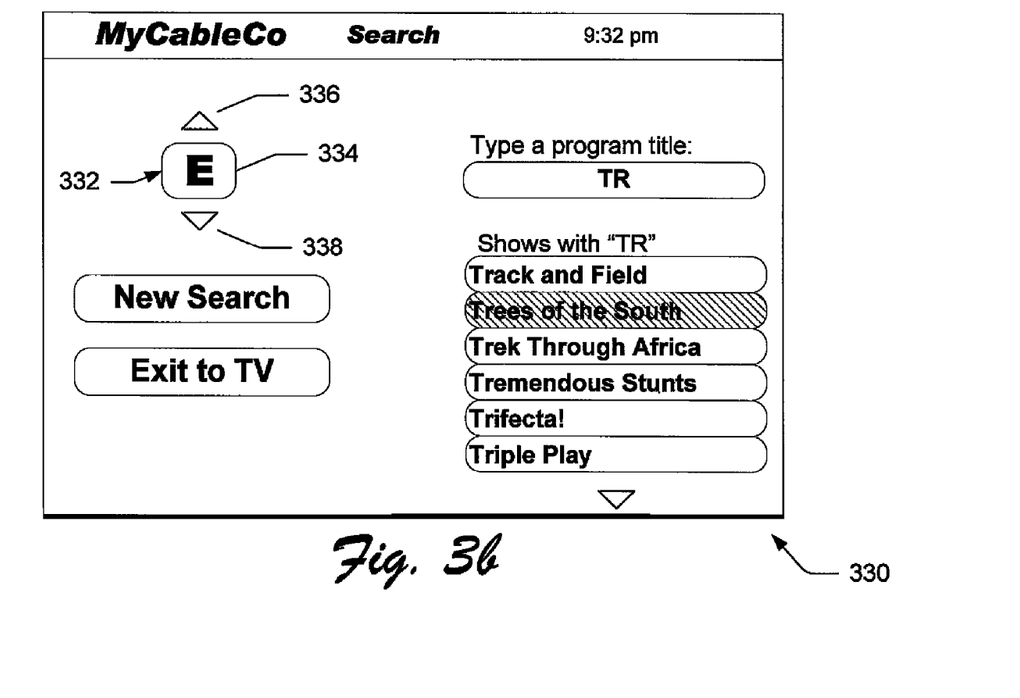
FIG. 3b illustrates an exemplary search user interface.

FIG. 3b depicts a UI display 330 that is similar to the UI display 300 shown in FIG. 3a, except that the UI display 330 includes a different type of on-screen keyboard 332. The on-screen keyboard 332 depicted in FIG. 3b includes a character display field 334 that displays a selected character (e.g., "E"). A scroll up actuator 336 is used to scroll toward a beginning of a character list that includes the selectable characters. Similarly, a scroll down actuator 338 is used to scroll toward an end of the character list.

Other than the type of on-screen display implemented in each of the UI displays 300, 330, there are no differences. Furthermore, other types of on-screen keyboards or techniques may be used to select characters for entry via the UI display 300, 332.

Exemplary Methodological Implementations

Figure 4:
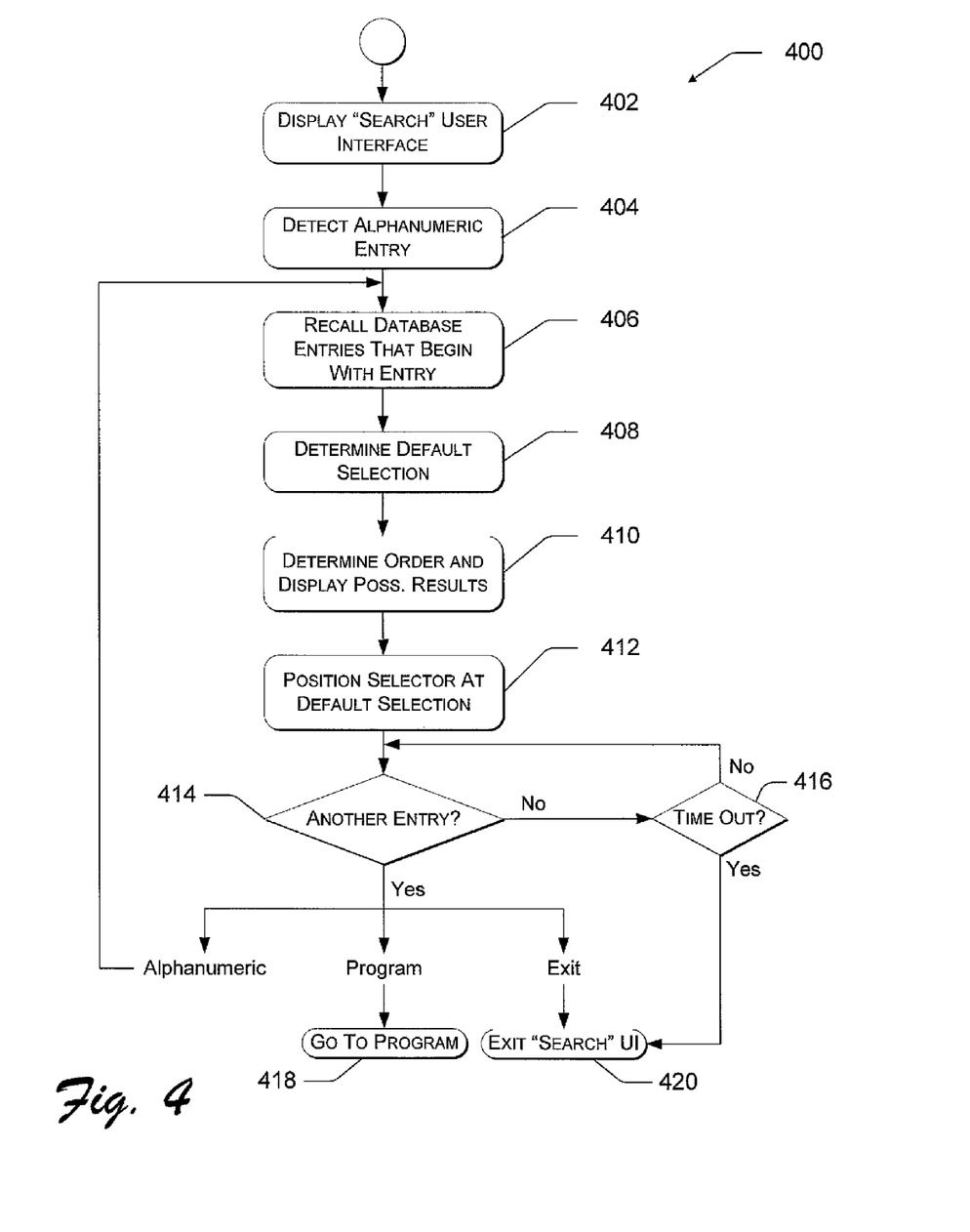
FIG. 4 is a flow diagram depicting a methodological implementation of intelligent default selection in an on-screen keyboard.

FIG. 4 is a flow diagram 400 depicting an exemplary methodological implementation of intelligent default selection in an on-screen keyboard. In the following discussion, continuing reference will be made to the elements and reference numerals shown in FIGS. 2, 3a and 3b.

At step 402, the user interface display 300 shown in FIG. 3a is displayed to a user on a display device 204 (FIG. 2) as a function of the UI code 233). The user is able to navigate across the UI display 300 with a control device, such as remote control device 235 or PDA 236 to position a selector (such as a highlight, cursor, etc.) on a selectable button or key. The selection module 228 (FIG. 2) enables the selector function and enters the designated character upon the actuation of an entry actuator (e.g., an "enter" button) by the user.

The selection module 228 may also be used to filter invalid character entries. For example, if an invalid entry is made, the selection module 228 may revert to the standard character entry display. In another implementation, the selection module 228 may darken particular character buttons that are not valid entries.

When a user enters an alphanumeric character via the on-screen keyboard 310 into the character entry field 316, the entry is detected and recognized by the search module 230 at step 404. The search module 230 searches a content database containing a set of known possible results (e.g., stored content 114, index(es) 115) and all entries containing the character detected in step 404 are recalled, i.e., are retained as possible results. The narrowed set of possible results is displayed in the content item description fields 320 as space allows.

For example, in FIG. 3a, the characters "TR" have been entered into the character entry field 316 in a first and second position of a character string. Available content items are being searched by title, so the set of possible results is narrowed to content item titles that begin with "TR." Several of such content item titles are displayed in the content item description fields 320.

In this example, the content items are searched based on a title. However, in other implementations, the content items may be searched based on actors, director, authors, musicians, performers, and the like, that are associated with the searched content items. The settings module 231 is used to store the particular attribute(s) of the searched-for characteristic of content item. The settings module 231 may provide a user interface (not shown) that enables the user to configure the settings module 231 to customize the search.

The default module 229 is configured to estimate a default selection at step 408, which is a character most likely to be the next selection in the character entry field 316. The previously entered characters are considered, which narrows the known set of possible results. The characters contained in the subsequent position of the character strings associated with the content items are evaluated to determine the character that appears most often in that position. That particular character is then determined to be the default selection for the next entry position.

In the present example, the search module 230 has recalled the content items that begin with the previously entered characters, i.e. "TR." The default module 229 has then determined that the character appearing in the subsequent position most often in the possible results is the character "E". ("E" occurs three times; "I" occurs two times; and "A" appears one time). Therefore, the "E" character is chosen as the default selection and the selector indicates the character "E" on the on-screen keyboard 310 or in the character display field 334 (step 412).

The order in which the displayed content item titles appear may be determined and displayed at step 410 by one or more criteria. In this example, the set of possible results that are displayed are sorted alphabetically according to the last selected character.

According to the present example, two characters ("TR") have been selected. The displayed content item titles are, therefore, displayed alphabetically according to the possible third characters, e.g., "Track and Field" is displayed first. However, the highlighted displayed content item is the first (alphabetically) displayed content item that contains the default selection character ("E") in the third character position. Here, the highlighted content item is "Trees of the South."

In an alternative implementation, the order in which the displayed content item titles appear may be determined alphabetically according to the default selection character. In such an implementation, content items containing the default selection in the third position of the title would be displayed before other content items. Content items that do not contain the default selection in the third position of the title would be displayed alphabetically after the content items that contain the default selection character.

The displayed content items that contain the default selection in the third position would be displayed alphabetically according to a character in the position subsequent to the default selection. Since two characters ("TR") have been entered in the character entry field 316, the default selection ("E") is the third character, and the content item titles in the set of possible results would be sorted alphabetically according to the characters appearing in a fourth position of the character strings that comprise the content item titles.

Specifically in the alternative example, content titles beginning with the characters "TRE" would be presented first, in alphabetical order according to the characters in the fourth position of the character string (i.e., the character appearing after the character "E"). Therefore, the first three content item description fields 320 would be: "Trees of the South"; "Trek Across Africa"; and "Tremendous Stunts."

During the default selection process, the default selection module 229 would also determined that the next-most-common occurring character after the initial "TR" is the character "I", with two occurrences. Therefore, the content titles beginning with the letters "TRI" would be displayed next, alphabetically according to the character occurring after the "I."

The final content title shown in the content item description fields 320 would be "Track and Field" since content titles beginning with "TRA" occur only one time. In a case in which there are several content titles that have the same number of occurrences of characters in a particular position—for instance, if another entry was "Trump Towers"—then the content titles would be ordered alphabetically according to the character in the position subsequent to the previously entered selection (i.e. the third position). When a content title appears that the user desires to select, the user may simply select the content item description field 320 in which the desired content item appears, and actuate the content item description field 320 to navigate to the program.

In at least one other implementation, instead of sorting the narrowed set of known results alphabetically, another criterion may be used. For example, the preferences module 232 is configured to track certain user behavior, such as most-accessed channels, favorite actors, favorite artists, favorite directors, favorite genres, etc. In conjunction with this, the settings module 231 is configured to sort results in a particular order (alphabetically, favorite channels, etc.).

If the settings module 231 is configured to sort by favorite channels, for example, then when the default selection module 229 narrows the set of possible results according to characters selected, then the favorite channels (identified from user behavior) will be displayed first—the most-accessed channel results being displayed first, the second-most-accessed channel results being displayed second, and so forth.

In another implementation, the favorite channels may be manually set by the user and stored in the preferences module 232. The favorite channels may be discrete selections, or they may be ranked from most favorite to least favorite, etc.

The default selection module 229 determines a character appearing in a subsequent position to the previously entered characters on the most-accessed channel and positions the selector at that character. If there are multiple possible results beginning with the previously entered characters that appear on the same (most-accessed) channel, then those possible results may appear in alphabetical order according to the character in a position subsequent to the positions of the previously entered characters.

In the specific context of a network search (such as a search on an Internet site), a special implementation may apply. In this instance, the settings module 231 may be configured to search the most common—or most popular—search terms entered on the network during a specified period of time, say, the last twenty-four or forty-eight hours. Additionally, the most popular search terms may indicate the most popular searches conducted by the user (user search terms), by all users on a particular device (local search terms), by all users on the network (global search terms), etc.

The same technique would be used whether the search(es) conducted were client-based or server-based. In a server-based search, the most-likely-next-hit scenarios would be calculated at the server and the results transmitted to the client. Furthermore, the search may search local or remote content databases or a combination of the two.

The techniques described for default selection may be applied to improve any type of search in any system with limited character entry facilities.

At step 414, the search application 227 waits for another entry from the user. If no entry is detected ("No" branch, step 414), then a time-out period may be calculated to avoid a system hang-up. As long as the time-out period has not expired ("No" branch, step 416), then the search application 227 continues to monitor for another entry. If the time-out period expires ("Yes" branch, step 416), then the search user interface (i.e., the UI display 300) is exited at step 420.

If another entry is detected before the time-out period expires ("Yes" branch, step 414) and the entry is a selection of one of the content item description fields 320 ("Program" branch, step 414), then the content item (program) identified in the selected content item description field 320 is accessed at step 418. If the entry is an alphanumeric character ("Alphanumeric" branch, step 414), then the process reverts to step 406 where a subsequent default selection is determined. If the entry is an exit selection ("Exit" branch, step 414), then the UI display 320 is exited at step 420.

Exemplary Broadcast Video Distribution Architecture

Figure 5:
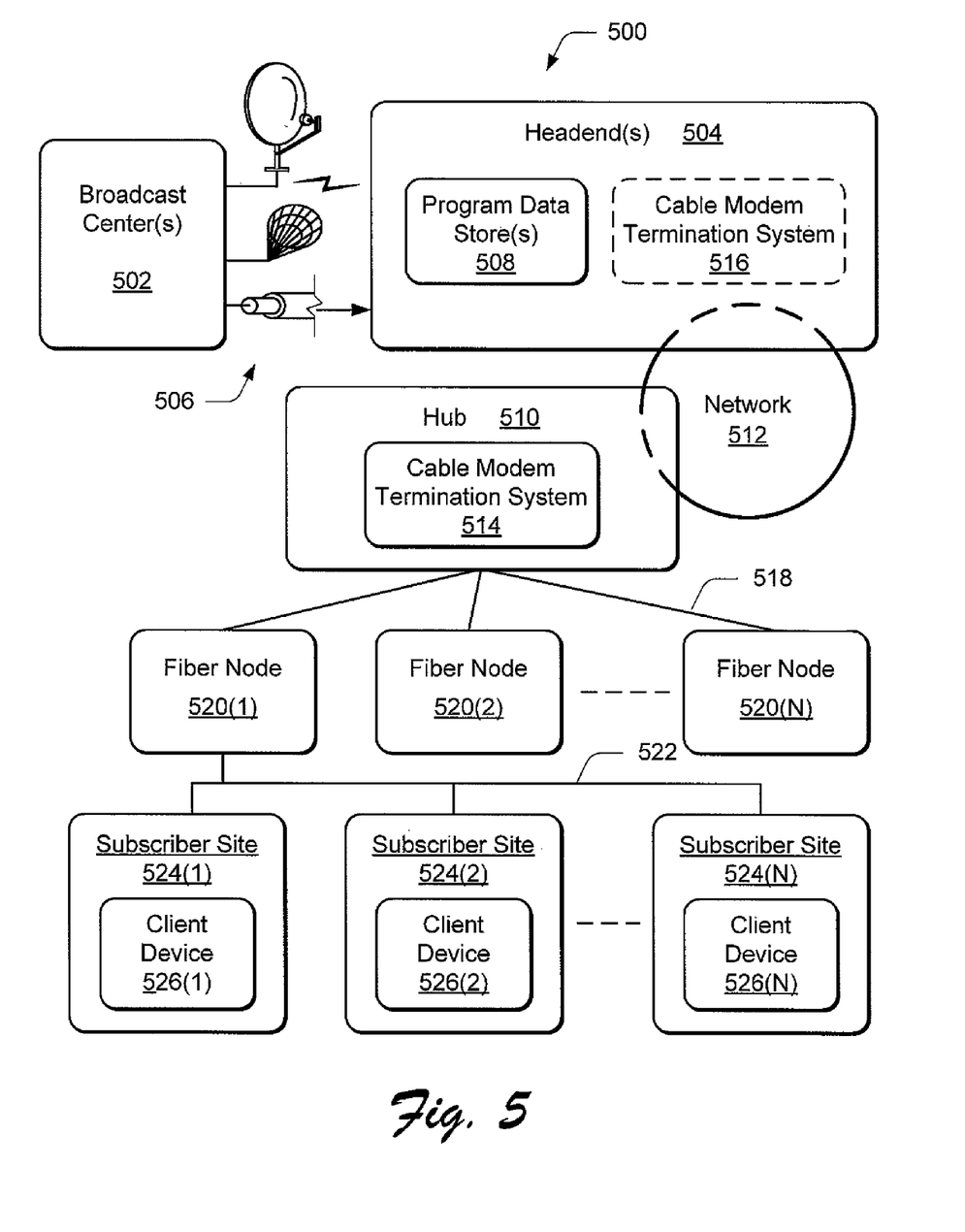
FIG. 5 illustrates an exemplary broadcast video distribution architecture in which the described techniques can be implemented.

The following description relates to a more detail discussion of an environment in which the present systems and methods may be implemented. In FIG. 5, one or more broadcast centers 502 provide broadcast content to one or more headends 504 via one or more transmission media 506. Each broadcast center 502 and headend 504 interfaces with the various transmission media 506, such as a satellite transmission, radio frequency transmission, cable transmission, and/or via any number of other transmission media. A broadcast center 502 can be implemented as a satellite operator, a network television operator, a cable operator, and the like.

A headend 504 includes one or more program data stores 508 to record the broadcast content that is received via a transmission media 506. The broadcast content can be stored, or otherwise recorded, while the broadcast content is in a compressed format, for example, in order to facilitate the ongoing storage of the content over days, weeks, or even indefinitely. The compression format may comport with a Moving Pictures Expert Group (MPEG) algorithm, such as MPEG-2, MPEG-4, and so forth. Other compression technologies may alternatively be employed, such as Microsoft Windows® Media, Advanced Simple Profile (ASP), Cintak, and the like.

A headend 504 and a hub 510 communicate across a network 512 which can be implemented as a fiber ring that may operate with a packet-based protocol, such as Internet protocol (IP), IP over asynchronous transfer mode (ATM), and other protocols. Packets can therefore be communicated between headend 504 and hub 510, which includes a cable modem termination system 514 for terminating communications from downstream cable modems. Alternatively, headend 504 may include a cable modem termination system 516 to terminate the cable modem communications. Although only one hub 510 is illustrated in architecture 500, a headend 504 can distribute broadcast content to multiple hubs 510 via network 512.

Hub 510 distributes the broadcast content over fiber lines 518 to one or more fiber nodes 520(1), 520(2) . . . 520(N). Each fiber node 520 has one or more coaxial lines 522 over which the broadcast content is output, and each coaxial line 522 includes coaxial line drops to multiple subscriber sites 524(1), 524(2), 524(N). Each subscriber site 524 includes one or more client devices 526(1), 526(2), . . . 526(N), respectively. Subscriber sites 524 can be homes, businesses, and the like with each subscriber site 524 including multiple client devices 526 that are each directly or indirectly interfacing with one or more of coaxial lines 522. Client devices 526 may be computers, set-top boxes of varying capabilities, hand-held and/or portable electronic devices, digital televisions, and so forth. Each client device 526 may include an integrated video screen or may be coupled to a video screen.

Figure 6:
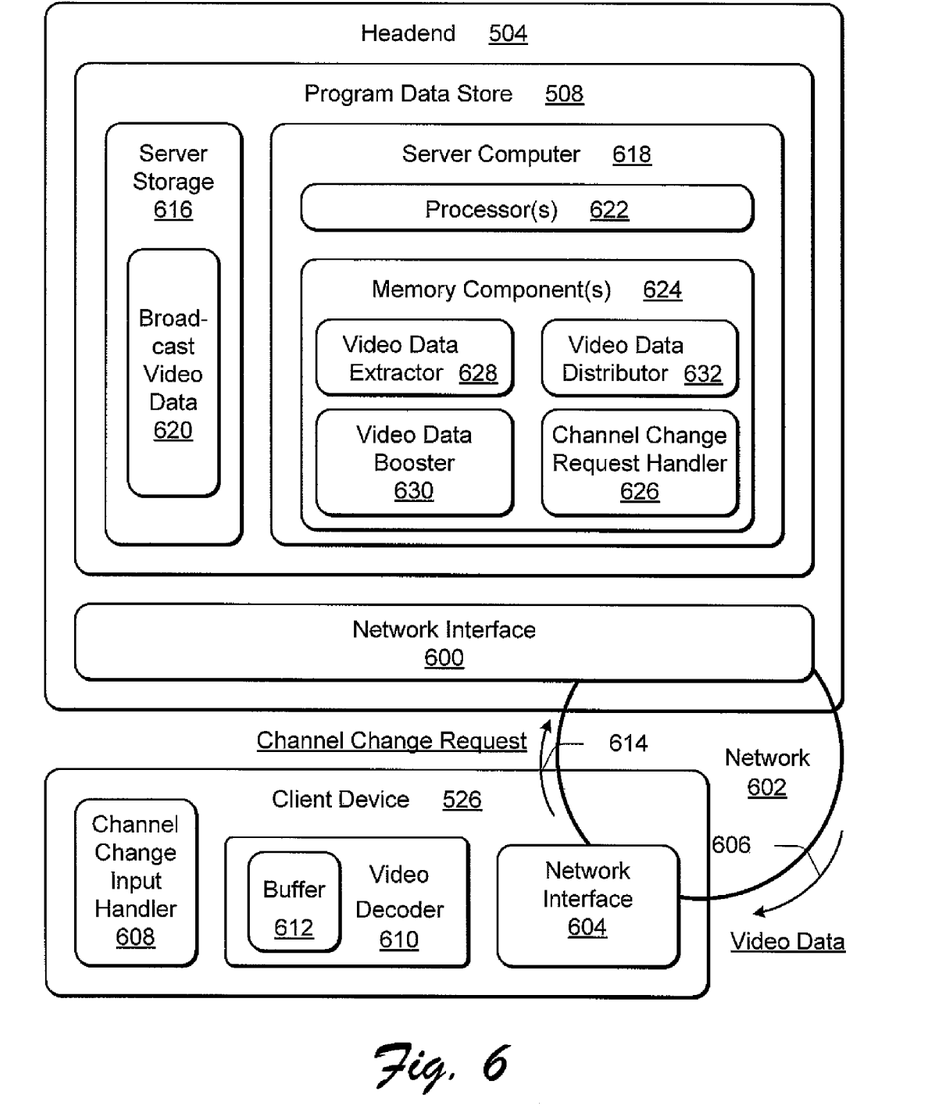
FIG. 6 further illustrates components of the exemplary broadcast video distribution architecture shown in FIG. 5.

FIG. 6 further illustrates an exemplary headend 504 and an exemplary client device 526 as shown in FIG. 5. Headend 504 includes a network interface 600 to communicate over a network 602, and client device 526 includes a network interface 604 to communicate over the network 602. Network 602 can be any two-way unicast network, such as a unicast network that enables point-to-point Internet protocol (IP) sessions, for example. Alternatively, network 602 can be implemented as a video-on-demand (VOD) type network, as a video over digital subscriber line (DSL)-based network, and the like.

Network 602 may include one or more other nodes that are upstream of client device 526 in addition to headend 504. For example, hub 510 (FIG. 5) and fiber nodes 520 may be located between client device 526 and headend 504 for forwarding and/or routing packets or other communications between the devices. Additionally, network 602 can be implemented as a combination of networks and network interfaces 600 and 604 may vary depending on the architecture of network 602. In an exemplary cable network implementation, network interface 600 includes a cable modem termination system (such as system 516 in FIG. 5) if there is not an intervening cable modem termination system in network 602, and network interface 604 includes a cable modem. Network interface 600 and/or network interface 604 may also include components for interacting with an IP network, a DSL network, and so forth. These components may include a receiver, a transmitter, a transceiver, etc. that are adapted to interact with the appropriate network.

In one exemplary implementation, broadcast content distribution from headend 504 to client device 526 is implemented with a point-to-point IP session that is established between headend 504 and client device 526. Broadcast content, such as video data 606 for a specific channel, is streamed to client device 526 across network 602. Thus, each client device 526 receives its own designated broadcast video data stream according to its corresponding requested channel. Further, each fiber node 520 (FIG. 5), if present, has a different current allocation of a two-way portion of the network that is intended for downstream transmissions to client devices 526.

Client device 526 includes a channel change input handler 608 and a video decoder 610, as well as the network interface 604. Video decoder 610 includes a buffer 612 for storing received broadcast content, such as the video data, prior to decoding. Channel change input handler 608 receives channel change input requests from a user of client device 526. A channel change input request can be received from a remote control, a keyboard, a personal digital assistant (PDA), a touch-sensitive screen, integrated keys, and from any other type of input device.

Channel change input handler 608 can be implemented as executable instructions and/or hardware, software, firmware, or some combination thereof. Channel change input handler 608 constructs a channel change request 614 in packet form that includes an indicator of the requested channel. Channel change request 614 is communicated from channel change input handler 608 to network interface 604 of client device 526 for transmission over network 602.

Network interface 600 of headend 504 receives channel change request 614 via network 602, and provides the channel change request 614 to the program data store 508. Program data store 508 includes server storage 616 and a server computer 618. Server storage 616 includes a storage device (not explicitly shown) that comprises mass memory storage, such as a disk-based storage device. Examples of suitable disk-based storage devices and/or systems include a redundant array of independent/inexpensive disks (RAID), a Fiber Channel storage device, and the like.

Server storage 616 stores broadcast video data 620 that is broadcast from a broadcast center 502 (FIG. 5) to headend 504 in a compressed format. In an exemplary implementation, the compressed format comprises a digital stream in accordance with an MPEG protocol, such as MPEG-4. However, other compression formats may alternatively be used. As the compressed digital stream is received at headend 504, it is stored as broadcast video data 620. Server storage 616 can maintain broadcast video data 620 for multiple channels as it is received over hours, days, weeks, and/or indefinitely.

Server computer 618 enables access to the stored, or otherwise recorded, broadcast video data 620 at server storage 616. Server computer 618 includes one or more processors 622 and one or more memory component(s) 624. Although not shown, server computer 618 may also include other components such as input/output interfaces; a local disk drive; hardware and/or software for encoding, decoding, and otherwise manipulating video data, and so forth. A memory component 624 can be implemented as, or include, a non-volatile memory such as disk drive(s) or flash memory and/or volatile memory such as random access memory (RAM). In an exemplary implementation, a memory component 624 includes processor-executable instructions.

Specifically, a memory component 624 includes the following processor-executable instructions: a channel change request handler 626, a video data extractor 628, a video data booster 630, and a video data distributor 632. The processor-executable instructions of memory component 624 can be executed on a processor 622 to implement functions as described below. In alternative implementations, one or more of channel change request handler 626, video data extractor 628, video data booster 630, and video data distributor 632 may be stored in a memory such that they are hardware encoded for automatic execution and/or for faster execution by a processor 622.

Network interface 600 forwards channel change request 614 to channel change request handler 626 that isolates the requested channel from channel change request 614 and provides the requested channel to video data extractor 628. Video data extractor 628 extracts broadcast video data for the requested channel from broadcast video data 620 of server storage 616. Video data distributor 632 communicates the broadcast video data to network interface 600, which transmits the broadcast video data over network 602 as video data packet(s) 606. Client device 526 receives the video data packet(s) 606 via network 602 at network interface 604.

CONCLUSION

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. A computer-readable medium storing instructions that, when executed, directs one or more processors to generate a graphical user interface, comprising:
   an on-screen keyboard displaying a set of characters to allow the user to select one or more characters for entry as a search term into a character entry field, the on-screen keyboard further displaying one character of the set of characters as a selected default character for selection with a single actuation, wherein the default character is selected based on search results associated with one or more previously selected characters, the search results having first characters matching the one or more previously selected characters and the default character being a most frequently appearing character following the first characters in the search results;
   the character entry field configured to display one or more characters entered as the search term by a user to search for one or more content items corresponding to ones of the search results;
   at least one character entry field description region to provide a description of the search term;
   one or more search result description fields to respectively display character strings associated with the search results matching the previously selected characters, wherein the character strings are ordered based on frequencies of appearance of a next character following the previously selected characters within the search results and based on alphabetic order within each subset of search results sharing a same next character; and
   at least one search result description region to provide a description of the search result description fields.

2. The computer-readable medium as recited in claim 1, wherein the on-screen keyboard further comprises, a selector configured to be situated in relation to an on-screen keyboard character so that the single actuation selects the on-screen keyboard character situated relative to the selector.

3. The computer-readable medium as recited in claim 1, wherein the on-screen keyboard further comprises, a selector configured to change the character to any character included in the set of characters available for selection, wherein the single actuation selects the character displayed in the character selection field.

4. The computer-readable medium as recited in claim 1, further comprising a new search button configured to initiate a search.

5. The computer-readable medium as recited in claim 1, wherein the search result description fields are selectable by the user to access content items associated with the search results.

6. The computer-readable medium as recited in claim 1, further comprising one or more scroll actuators configured to scroll through the search result description fields.

7. The computer-readable medium as recited in claim 6, wherein the one or more scroll actuators are configured to scroll through additional search result description fields not displayed on the graphical user interface.

8. The computer-readable medium as recited in claim 1, further comprising an exit button configured to close the graphical user interface.

9. The computer-readable medium as recited in claim 1, further comprising a title bar configured to display captions and information to the user.

10. The computer-readable medium as recited in claim 9, wherein the title bar displays one or more of a broadcast network name, page title or current time.

11. A computer-readable medium storing instructions that, when executed, directs one or more processors to generate a graphical user interface, comprising:
    a character display field displaying a one character of a set of characters to allow the user to select the one character or a different character for entry as a search term into a character entry field, the one character being a default character selected based on search results associated with one or more previously selected characters, the search results having first characters matching the one or more previously selected characters and the default character being a most frequently appearing character following the first characters in the search results;
    the character entry field configured to display one or more characters entered as the search term by a user to search for one or more content items corresponding to ones of the search results;
    at least one character entry field description region to provide a description of the search term;
    one or more search result description fields to respectively display character strings associated with the search results matching the previously selected characters, wherein the character strings are ordered based on frequencies of appearance of a next character following the previously selected characters within the search results and based on alphabetic order within each subset of search results sharing a same next character; and
    at least one search result description region to provide a description of the search result description fields.

12. The computer-readable medium as recited in claim 11, wherein the character display field further comprises one or more scroll actuators configured to scroll through a list of characters.

13. The computer-readable medium as recited in claim 11, further comprising a new search button configured to initiate a search.

14. The computer-readable medium as recited in claim 11, wherein the search result description fields are selectable by the user to access content items associated with the search results.

15. The computer-readable medium as recited in claim 11, further comprising an exit button configured to close the graphical user interface.

16. The computer-readable medium as recited in claim 11, further comprising a title bar configured to display captions and information to the user.

17. The computer-readable medium as recited in claim 16, wherein the title bar displays one or more of a broadcast network name, page title or current time.

18. A method, comprising:
- selecting a default character based on search results associated with one or more previously selected characters, the search results having first characters matching the one or more previously selected characters and the default character being a most frequently appearing character following the first characters in the search results;
- displaying an on-screen keyboard in that includes a set of characters in a graphical user interface, one character of the set of characters being visually indicated as the default character for selection with a single actuation;
- receiving a selection of one character of the set of characters;
- determining a plurality of search results matching a search term, the search term including characters that match the previously selected characters and the selected one of the set of characters;
- ordering character strings associated with the plurality of search results based on frequencies of appearance of a next character following the previously selected characters within the plurality of search results and based on alphabetic order within each subset of search results sharing a same next character; and
- displaying the ordered character strings in one or more search result description fields of the graphical user interface.

19. The method of claim 18, further comprising displaying a search result description region to provide a description of the search result description fields.

20. The method of claim 18, further comprising displaying a character entry field configured to display one or more characters entered as the search term by a user to search for one or more content items corresponding to ones of the search results.

* * * * *